United States Patent
Wu et al.

(10) Patent No.: US 7,804,416 B2
(45) Date of Patent: Sep. 28, 2010

(54) METHODS AND SYSTEMS FOR TRACKING USERS AND PROVIDING SERVICES

(75) Inventors: Chao-Lin Wu, Taipei (TW); Li-Chen Fu, Taipei (TW)

(73) Assignee: National Taiwan University, Taipei (TW)

(*) Notice: Subject to any disclaimer, the term of this patent is extended or adjusted under 35 U.S.C. 154(b) by 337 days.

(21) Appl. No.: 12/140,920

(22) Filed: Jun. 17, 2008

(65) Prior Publication Data

US 2009/0051559 A1  Feb. 26, 2009

(30) Foreign Application Priority Data

Aug. 22, 2007 (TW) .............................. 96131045 A (51) Int. Cl.
*G08B 21/00* (2006.01)
(52) U.S. Cl. .................... 340/666; 340/665; 340/573.1; 340/573.4; 340/436; 340/438; 340/540; 340/541; 340/686.1; 340/539.16; 340/539.26; 701/45; 701/46; 702/41; 702/139; 463/31; 463/32; 463/36; 463/37; 463/43

(58) Field of Classification Search ................. 340/666, 340/573.1, 573.4, 436, 438, 540, 541, 665, 340/686.1, 539.13, 539.26; 701/45, 46; 702/41, 702/139; 463/31, 32, 36, 37, 43
See application file for complete search history.

(56) References Cited

U.S. PATENT DOCUMENTS

| | | | |
|---|---|---|---|
| 6,515,586 B1 * | 2/2003 | Wymore | 340/541 |
| 6,707,386 B1 * | 3/2004 | Pruisner | 340/665 |
| 6,885,304 B2 * | 4/2005 | Cliff et al. | 340/573.1 |

* cited by examiner

*Primary Examiner*—Tai T Nguyen (57) ABSTRACT

Methods and systems for tracking users and providing services are provided. The system comprises a plurality of pressure sensors, a storage unit, at least one service providing unit having a service, and a signal processing unit. The pressure sensors detect pressure applied thereon at a specific time point, and correspondingly generate sensed signals. The signal processing unit receives the sensed signals from the pressure sensors, and stores the sensed signals to the storage unit. The signal processing unit calculates a current state of an object according to the sensed signals and historical sensed signals and historical states of the object in the storage unit, and determines one of the at least one service providing unit according to the current state to activate service thereof.

22 Claims, 9 Drawing Sheets

| $BW^{j+5}$ | $BW^{j+4}$ | $BW^{j+3}$ | $BW^{j+4}$ | $BW^{j+5}$ |
|---|---|---|---|---|
| $BW^{j+4}$ | $BW^{j+2}$ | $BW^{j+1}$ | $BW^{j+2}$ | $BW^{j+4}$ |
| $BW^{j+3}$ | $BW^{j+1}$ | $BW^{j}$ | $BW^{j+1}$ | $BW^{j+3}$ |
| $BW^{j+4}$ | $BW^{j+2}$ | $BW^{j+1}$ | $BW^{j+2}$ | $BW^{j+4}$ |
| $BW^{j+5}$ | $BW^{j+4}$ | $BW^{j+3}$ | $BW^{j+4}$ | $BW^{j+5}$ |

FIG. 10B

METHODS AND SYSTEMS FOR TRACKING USERS AND PROVIDING SERVICES

CROSS REFERENCE TO RELATED APPLICATIONS

This Application claims priority of Taiwan Patent Application No. 096131045, filed on Aug. 22, 2007, the entirety of which is incorporated by reference herein.

BACKGROUND OF THE INVENTION

1. Field of the Invention

The disclosure relates generally to methods and systems for tracking users and providing services, and, more particularly to methods and systems that track users via pressure mechanisms, and automatically provide services to users.

2. Description of the Related Art

Driven by advancements in information technology, convenient and efficient provision of information is being required by users. As such, accurately providing user requirements, such as information or services, have become an important issue. One example, is in the field related to user tracking systems.

For conventional user tracking mechanisms, user positioning can be obtained by using cameras and devices, such as an RFID (Radio Frequency Identification), a wireless signal transmitter, or a mobile phone carried by a user. The approximate user position within an environment can be realized via cameras. However, user positioning requires many operational adjustments to set the cameras. If personnel lack required training or experience, proper use of cameras may not be fully realized. In a worst case scenario, the cameras may be ineffective, or even reveal erroneous results. Additionally, if the lighting in different environments substantially vary, camera results may have large inaccuracies. When users are tracked via a carried device, the addition of an item to be carried is inconvenient for users. If users forget to carry the device, user tracking can not be achieved. Furthermore, wireless signals may be influenced by changes in the environment. For example, the accuracy of wireless signals may be influenced by moving objects or furnishing changes. Additionally, stability of user tracking systems may be influenced by power depletion. Therefore, user tracking mechanisms are provided herein, wherein stability of user tracking systems will not be influenced by changes in the environment.

Also, as previously mentioned, an important issue concerning user tracking systems is to accurately provide user requirements, such as information or services. For conventional service providing mechanisms, services are provided according to user preferences. However, users may also want to determine required services according to positioning in an environment. Currently, conventional service providing mechanisms do not automatically provide services based upon user position.

BRIEF SUMMARY OF THE INVENTION

Methods and systems for tracking users and providing services are provided.

An objective of the invention provides methods and systems for tracking users and providing services that use pressure sensors to detect weights of objects and users in an environment, and determine user state according to the data detected by the pressure sensors, and provide related services accordingly.

An embodiment of a system for tracking users and providing services comprises a plurality of pressure sensors, a storage unit, at least one service providing unit having a service, and a signal processing unit. The pressure sensors detect pressure applied thereon at a specific time point, and generate sensed signals correspondingly. The storage unit stores historical sensed signals corresponding to the pressure sensors, and historical states of an object. The signal processing unit receives the sensed signals from the pressure sensors, and stores the sensed signals to the storage unit. The signal processing unit calculates a current state of the object according to the sensed signals and the historical sensed signals and the historical states of the object in the storage unit, and determines one of the at least one service providing unit to activate the service thereon.

In an embodiment of a method for tracking users and providing services, a plurality of pressure sensors is set in an environment. The pressure sensors detect pressure applied thereon at a specific time point, and generate sensed signals correspondingly. A current state of an object is calculated according to the sensed signals and historical sensed signals of the pressure sensors and historical states of the object. At least one service providing unit is determined to activate the service thereon according to the state of the object.

Methods and systems for tracking users and providing services may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Methods and systems for tracking users and providing services are provided.

Figure 1:
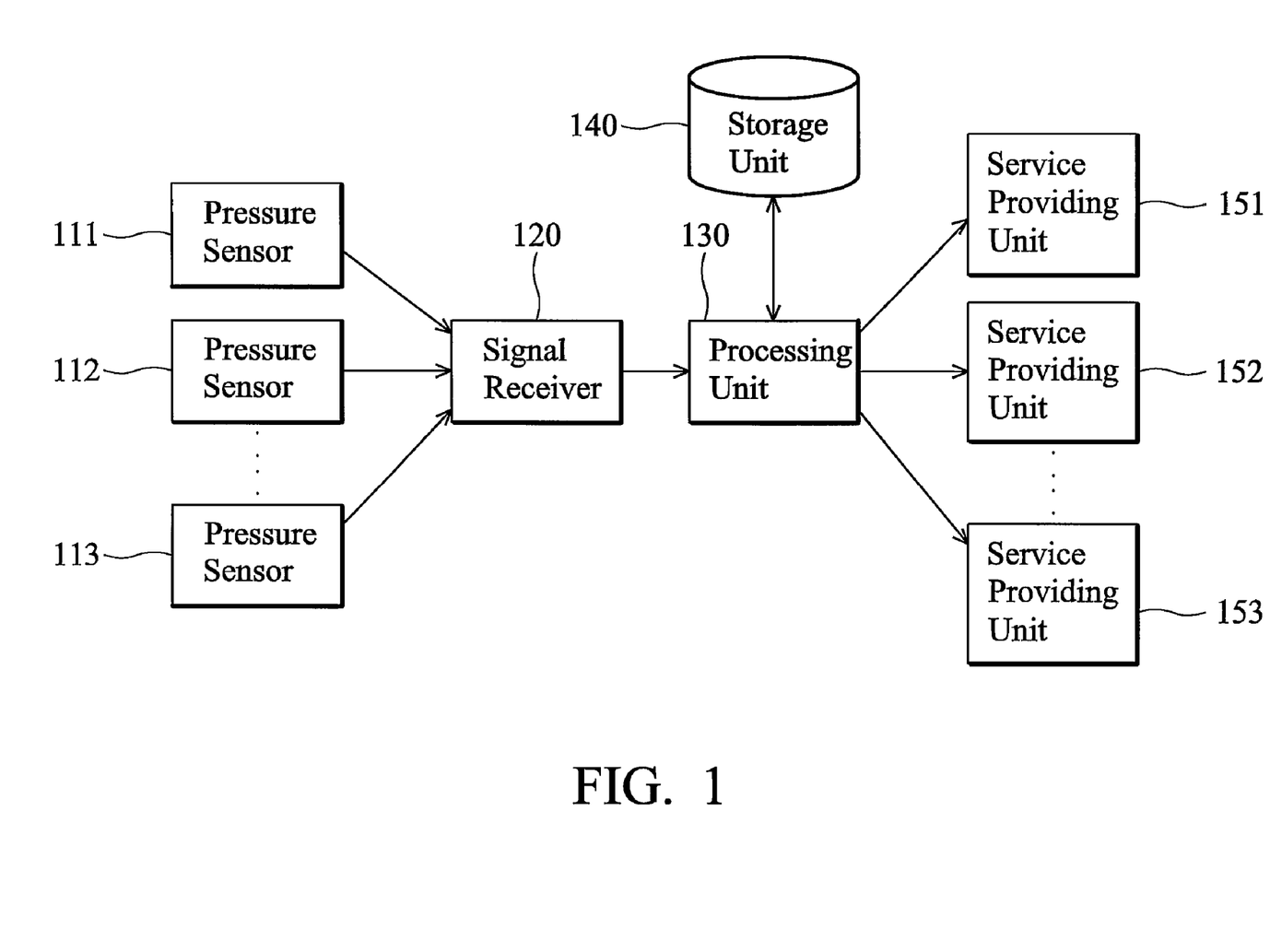
FIG. 1 is a schematic diagram illustrating an embodiment of a system for tracking users and providing services according to the invention.

FIG. 1 is a schematic diagram illustrating an embodiment of a system for tracking users and providing services according to the invention.

The system for tracking users and providing services comprises a plurality of pressure sensors 111, 112 and 113, at least one signal receiver 120, a processing unit 130, a storage unit 140, and a plurality of service providing unit 151, 152 and 153. The pressure sensors 111, 112 and 113 may be digital or analog weight/pressure sensors for detecting weight/pressure applied thereon and accordingly generating sensed signals. The signal receiver 120 couples to the pressure sensors, and receives the sensed signals therefrom. The signal receiver 120 transforms the sensed signals between the variation of current and voltage into digital values, and performs error adjustments and initial noise filtering operations. The signal receiver 120 transmits the processed signals to the processing unit 130. The processing unit 130 then stores the sensed signals to the storage unit 140, and calculates a current state of an object, such as a user according to the received sensed signals and historical sensed signals and historical states of the object in the storage unit 140. It is understood that the object state may comprise a position and a moving speed of the object. After the current state of the object is obtained, the processing unit 130 stores the current state of the object to the storage unit 140. The service providing units 151, 152 and 153 may be equipments providing audio/video multimedia, audio, lighting, and other services. The processing unit 130 can determine at least one of the service providing units to activate the service thereon, according to the current state of the object.

Figure 2:
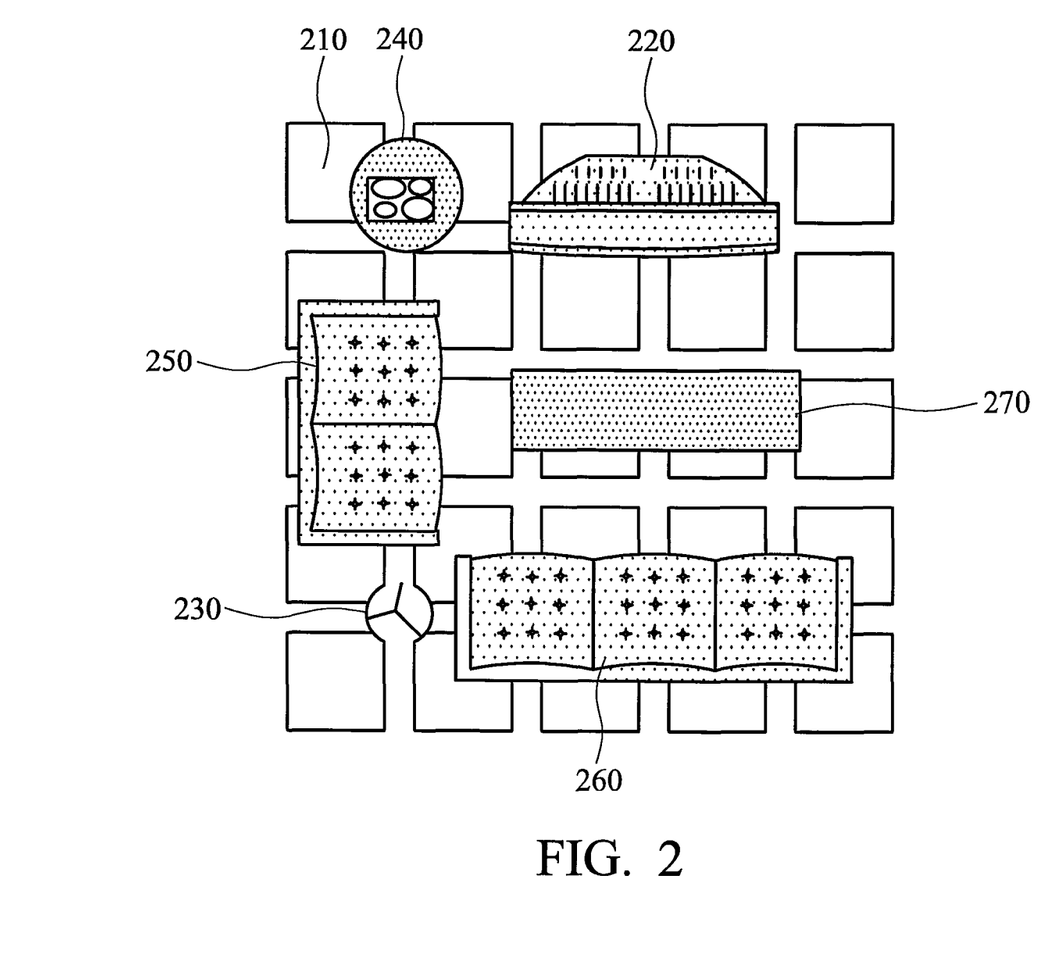
FIG. 2 is a schematic diagram illustrating an embodiment of an example environment in the system for tracking users and providing services according to the invention.

FIG. 2 is a schematic diagram illustrating an embodiment of an example environment in the system for tracking users and providing services according to the invention. In this example, pressure sensors 210 (the squares in FIG. 2) can be set in an environment in a matrix manner. For example, the pressure sensors 210 can be set below the floor of a living room. In this environment, the service providing units comprise a television 220 and an electric light 230, for providing audio/vide multimedia service and lighting service, respectively. Additionally, furniture comprising tables 240 and 270 and sofas 250 and 260 are in the environment. In some embodiments, the processing unit 130 can receive sensed signals from the pressure sensors at a preset time point, such as 2 o'clock AM, and set the received data at this time point as net sensed signals of the environment. At this time point, it is assume that no user is in the environment. The sensed signal at this time point can be used to adjust other sensed signals at other time points, to discover possible changes in the environment, such as the movement of furniture or adding/removal of electric appliances.

In some embodiments, the storage unit 140 can store related information such as weight and preferences of different users. The processing unit 130 can calculate the weight of an object according to the received sensed data, and identify a user according to the calculated weight and data previously stored in the storage unit 140. The processing unit 130 can correspondingly determine at least one service providing unit to activate the service thereon, according to the identified user and the state.

Figure 3:
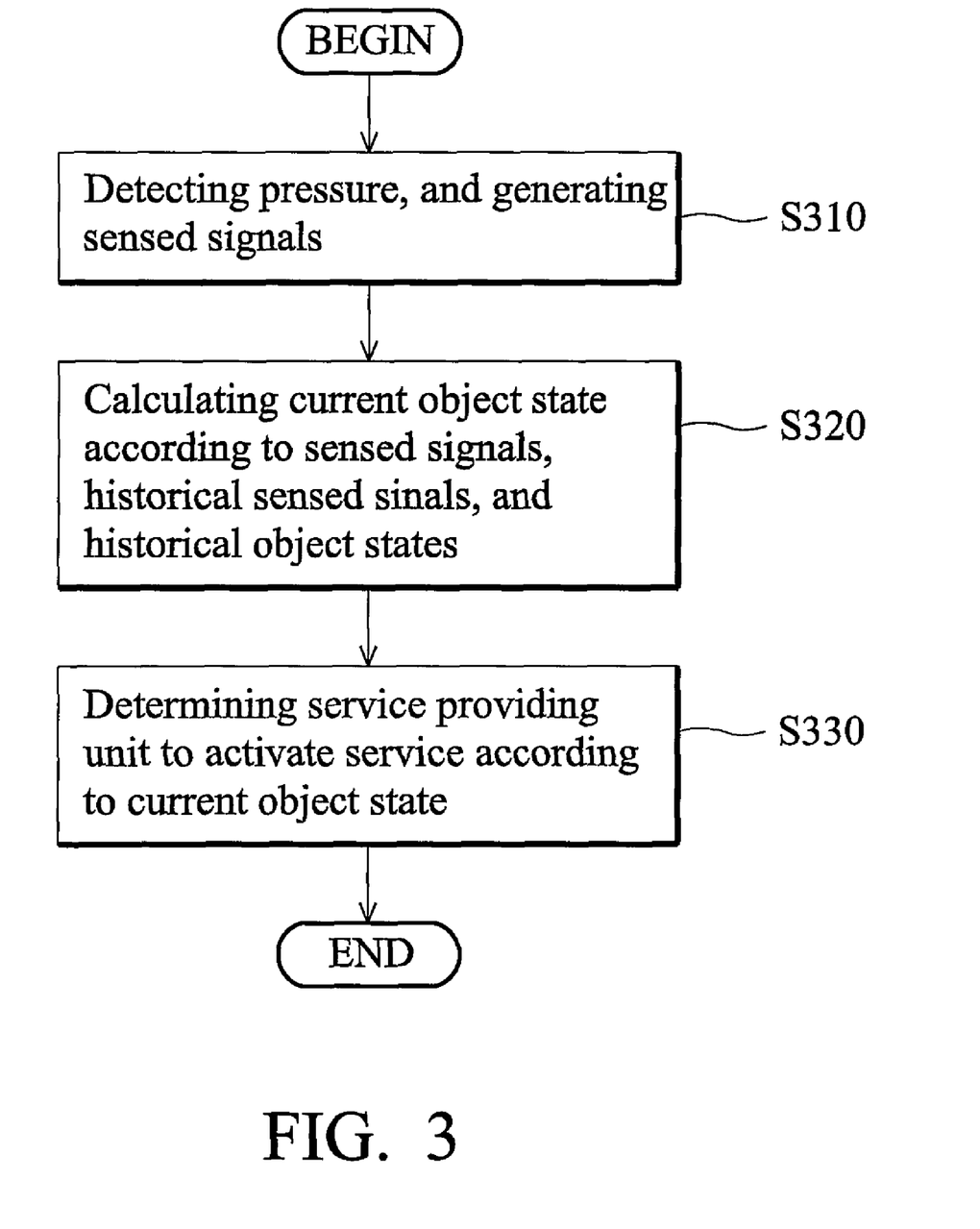
FIG. 3 is a flowchart of an embodiment of a method for tracking users and providing services according to the invention.

FIG. 3 is a flowchart of an embodiment of a method for tracking users and providing services according to the invention.

In step S310, pressure applied on pressure sensors are detected at a specific time point, and sensed signals are correspondingly generated. In step S320, a current state of an object such as a user is calculated according to the sensed signals and historical sensed signals of the pressure sensors and historical states of the object. It is understood that the object state comprises a position and a moving speed. The detail of state calculation is discussed as follows.

Figure 4:
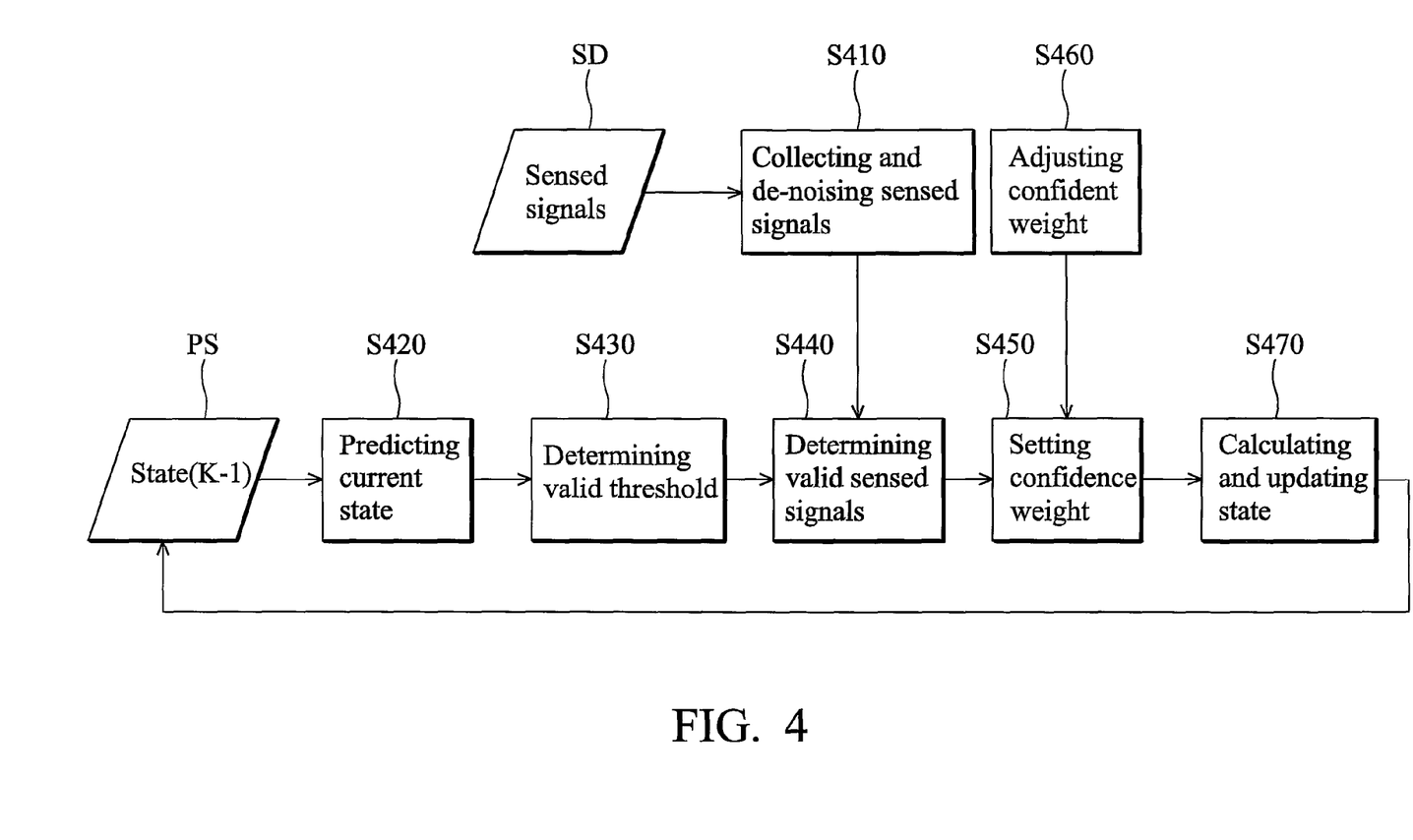
FIG. 4 is a flowchart of an embodiment of a state calculation method according to the invention.

FIG. 4 is a flowchart of an embodiment of a state calculation method according to the invention.

In step S410, original sensed signals SD are received from the pressure sensors, and the sensed signals are de-noised to obtain pure sensed signals. The sensed signals may comprise an environment coordinate having weight responses at the current time point, and the corresponding weight values. It is understood that, the noises de-noised in step S410 may be the measurement error due to the inaccuracy of sensor specification, the signal interference due to the environment electromagnetic waves on the transmission lines between the pressure sensors and the signal receiver, and/or a fixed difference applied on the pressure sensors due to the use breakage of floor in the environment. The measurement error and the signal interference of sensed signals can be de-noised by ignoring the weight values within a predefined range. The predefined range can be determined according to the accuracy of the pressure sensors. Additionally, the fixed difference of the sensed signals can be de-noised by regarding the fixed difference as the background information of the environment. That is, to add the fixed difference to the net sensed signals. The sensed signals of the environment coordinate will be ignored only when the net variance occurs in the weight value corresponding to the environment coordinate in the sensed signals.

In step S420, a user state in the environment at the current time point is predicted according to a previous state PS(State (K−1)) in the environment at a previous time point and a predefined prediction matrix. It is noted that the content of the prediction matrix may be different based on different tracking applications. If the user has a uniform motion in the environment, user positioning at the current time point is predicted by user positioning at the previous time point and the moving vector comprising direction and speed, and the moving speed of the user at the current time point equals to that at the previous time point. $\hat{X}(k)$ is the user state at a K time point. The user state comprises an environment coordinate $(x, y)$, and a moving speed $(v_x, v_y)$. A prediction equation integrating the user state and the prediction matrix F is $\hat{X}(k)=F \cdot \hat{X}(k-1)$, where the prediction matrix F is $$\begin{bmatrix} 1 & 0 & \Delta t & 0 \\ 0 & 1 & 0 & \Delta t \\ 0 & 0 & 1 & 0 \\ 0 & 0 & 0 & 1 \end{bmatrix},$$

if the use has a uniform motion in the environment.

In step S430, a valid threshold for the variance of the environment coordinates in the user state is determined according to the predicted current state and a preset threshold value, and in step S440, the pure sensed signals after denosing is filtered according to the valid threshold to obtain valid sensed signals. It is understood that the valid sensed signals can be used to adjust the environment coordinates. In step S430, $\hat{X}(k|k-1)$ is the predicted user state at the K time point according to the information at the K−1 time point.

$Y_i(k)$ represents the i-th pure sensed signals. H is an observation matrix representing the error of sensed position. The difference between the environment coordinate of the i-th pure sensed signals and the environment coordinate of the user state is represented as: $v_i(k)=Y_i(k)-H\cdot\hat{X}(k|k-1)$. If no sensed error exists in the measurement tool, H may be an identity matrix. Based on the sensed difference $v_i$, the pure sensed signals $Y_i$ conforming to the following equation is the valid sensed signals: $\tilde{v}_k(\gamma)=\{Y_i:v_i^T S^{-1}(k)v_i \leq \gamma\}$, where $\gamma$ is the threshold value, and $S(k)$ is from a Kalman Filter and related required information. The obtained valid sensed signals are $\tilde{Z}(k)=\{i=1,2,\ldots,m_k\}$, where $Z_i$ is the i-th valid sensed signals. When $K(k)$ is the standard gain of Kalman, the coordinate information of the valid sensed signals can be updated according to the following equation: $\hat{Z}_i(k|k)=\hat{X}(k|k-1)+K(k)\cdot v_i(k)$.

Figure 5:
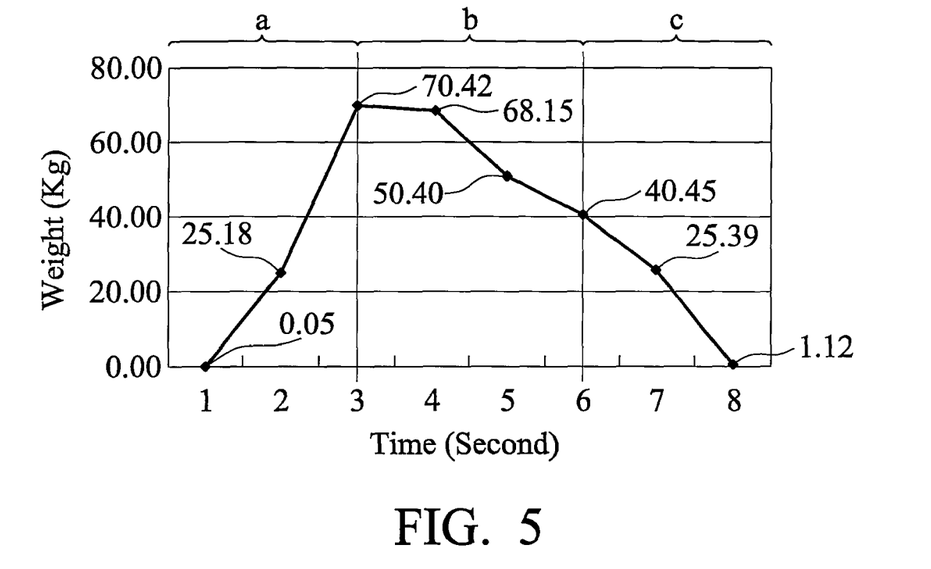
FIG. 5 is a schematic diagram illustrating an embodiment of a weight distribution curve during object movement according to the invention.
Figure 6:
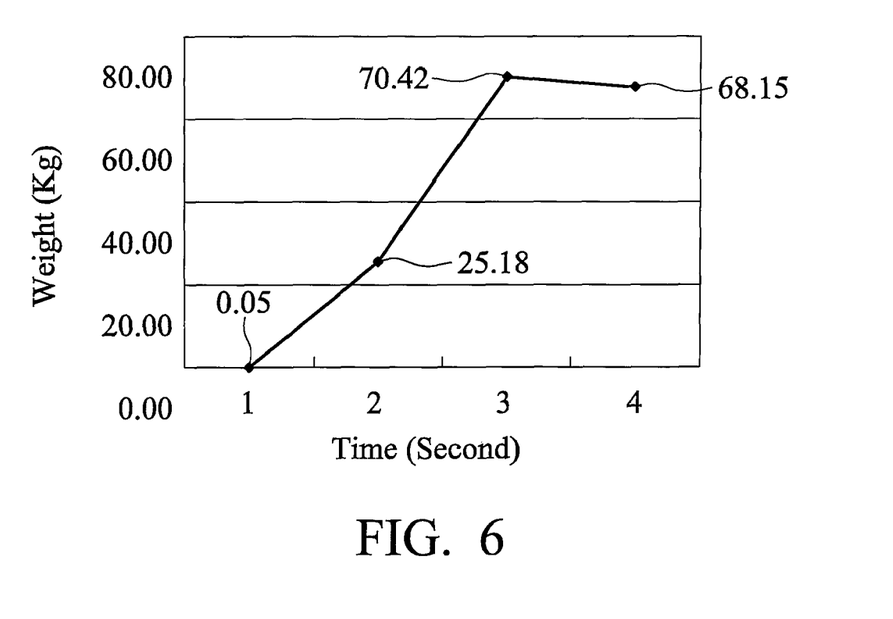
FIG. 6 is a schematic diagram illustrating an embodiment of a weight distribution curve for objects according to the invention.
Figure 7:
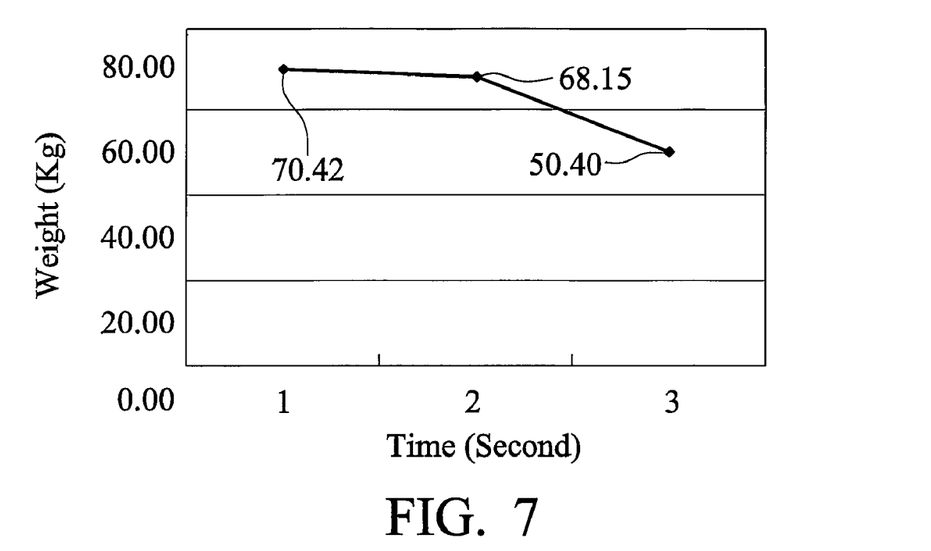
FIG. 7 is a schematic diagram illustrating another embodiment of a weight distribution curve for objects according to the invention.
Figure 8:
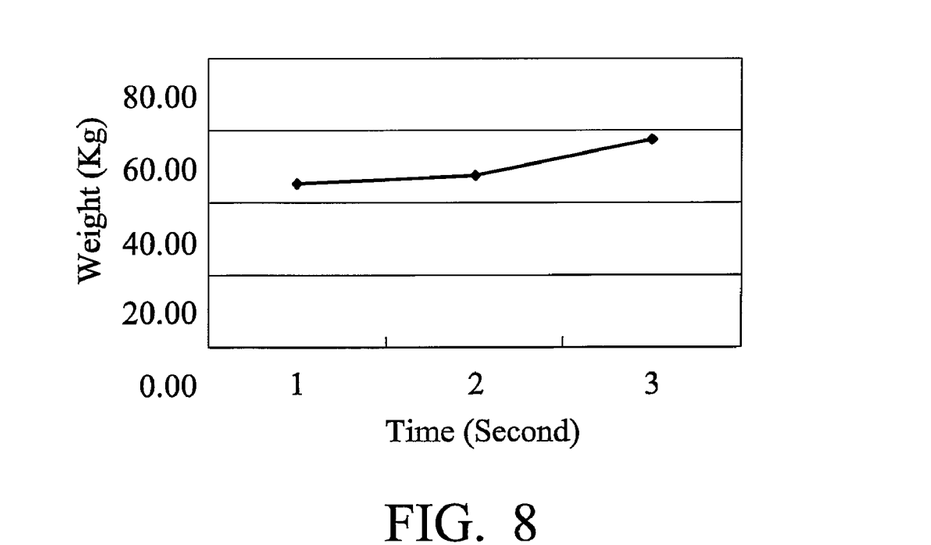
FIG. 8 is a schematic diagram illustrating an embodiment of a weight distribution curve during overlapping of objects according to the invention.

In step S450, a confidence weight is set for the valid sensed signals. The confidence weight can be determined according to the sensed signals, such as the weight value currently measured in the environment coordinate, and the distribution characteristic, such as a weight distribution curve of the weight values measured in a previous period. In some embodiments, the movement of an object having a weight includes three stages: (a) the object moves near by the pressure sensor, (b) the object moves on the pressure sensor, and directly places pressure thereon, and (c) the object moves and leaves the pressure sensor. The corresponding distribution curve is shown in FIG. 5. Referring to FIGS. 6 and 7, if the distribution characters of the weight values measured currently and the weight values measured in the previous period are shown as in FIGS. 6 and 7, respectively, the environment coordinate corresponding to the current sensed signals is regarded as a possible user coordinate. Additionally, in some embodiments, the sensed signals may be contributed by several users. If the weight value of the sensed signals exceeds a specific threshold as shown in FIG. 8, the environment coordinate corresponding to the sensed signals is also regarded as a possible user coordinate. The sensed signals conforming to the distribution character are set with a certain value of confidence weight.

It is noted that if several users are interlaced, the sensed signals must be influenced by the users. Therefore, in step S460, the confidence weight is adjusted according to the historical state of the user. In this embodiment, the confidence weight can be adjusted according to a LZ-Trie. The data stored in the LZ-Trie is the historical records for the user movement in the environment. The LZ-Trie uses a storage manner such as Active-LeZi to record environment coordinates during the user movement. User positioning frequently occurring in the historical records will be set a higher confidence weight according to the historical records, the current user position, and the recent movement path of the user. If the coordinate of the i-th valid sensed signals at the K time point is $Z_i(k)$, and the probability of the coordinate occurred in the LZ-Trie of the j-th historical record is $L_j(Z_i(k))$, the system predicts the coordinate of the j-th user at the K time point is $$p_j(k) = \left(\sum_{i=1}^{l_k} L_j(Z_i(k)) * Z_i(k)\right) \bigg/ \left(\sum_{i=1}^{l_k} L_j(Z_i(k))\right).$$

If the original confidence weight of the i-th valid sensed signals is $\beta_i$, and the difference between the valid sensed signals and $p_j(k)$ is $d_{ji}$, the adjustment of the confidence weight is an inverse ratio to the $d_{ji}$. That is, the new confidence weight of the i-th valid sensed signals for the j-th user is $$\alpha_{ji} = \beta_i * \varphi_{ji}, \text{ where } \varphi_{ji} = \begin{cases} \dfrac{1}{d_{ij}}, & \text{else} \\ D, & d_{ji}=0 \end{cases}.$$

Finally, in step S470, weighted sensed signals are calculated according to the valid sensed signals and the confidence weight to obtain the current environment coordinate of the user. The coordinate, and the difference of the coordinate at the previous time point are used to calculate the moving speed and direction of the user, thus to obtain a current state State (K) of the user. It is understood that the current state State(K) can be used as an input of step S420 for prediction of the next time point. If the amount of the valid sensed signals is $m_k$, and the confidence weight of the i-th valid sensed signals is $\beta_i$, the predicted coordinate of the user is $$\hat{X}(k|k) = \left(\sum_{i=1}^{m_k} \hat{Z}_i(k|k)*\beta_i\right) \bigg/ \left(\sum_{i=1}^{m_k} \beta_i\right).$$

If the confidence weight is adjusted as $\alpha_{ji}$ due to interlaced users, the predicted coordinate of the j-th user is $$\hat{X}_j(k|k) = \frac{\sum_{i=1}^{m_k} \hat{Z}_i(k|k)*\alpha_{ji}}{\sum_{i=1}^{m_k} \alpha_{ji}}.$$

Additionally, if an estimated state of the user at the previous time point is $\hat{X}(k-1)$, the current state of the user is $$\hat{X}(k) = \begin{bmatrix} \hat{x}(k) \\ \hat{y}(k) \\ \dfrac{\hat{x}(k)-\hat{x}(k-1)}{\Delta t} \\ \dfrac{\hat{y}(k)-\hat{y}(k-1)}{\Delta t} \end{bmatrix}.$$

After the current state of the user is obtained, the current state of the user is stored to the storage unit.

Referring to FIG. 3 again, in step S330, at least one of the service providing units is determined to activate the service thereon, according to the current state of the user.

Figure 9:
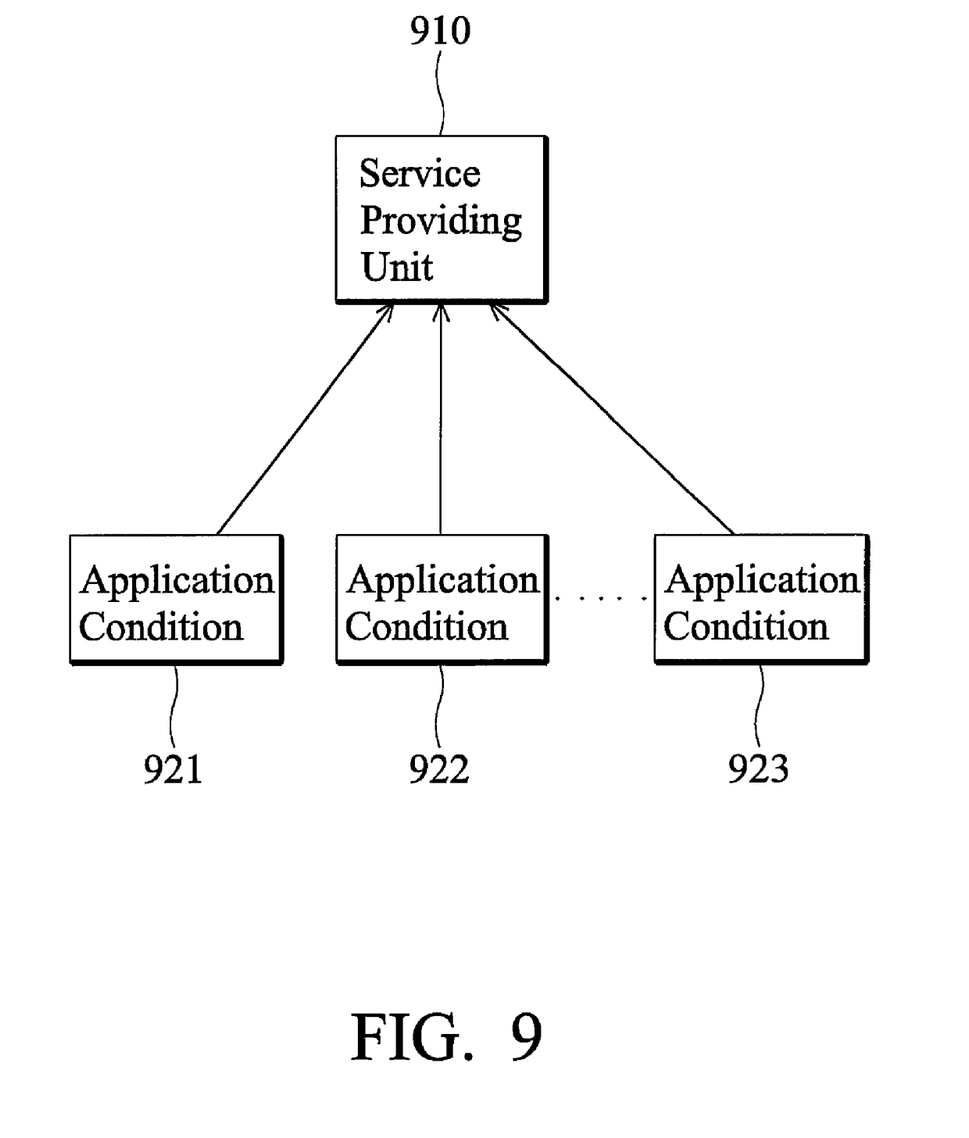
FIG. 9 is a schematic diagram illustrating an embodiment of a relationship between service providing units and application conditions according to the invention.
Figure 10A:
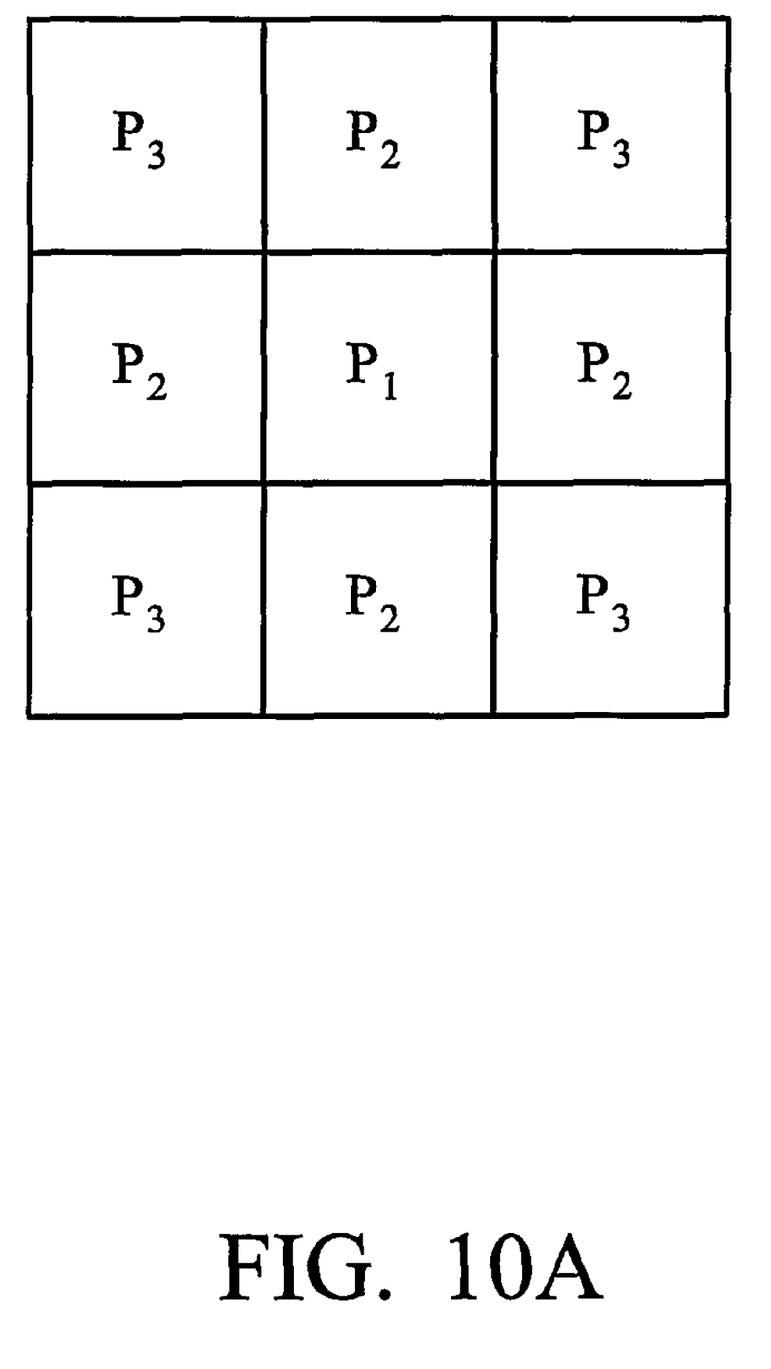
FIG. 10A is a schematic diagram illustrating an embodiment of a position prediction mask according to the invention.
Figure 10B:
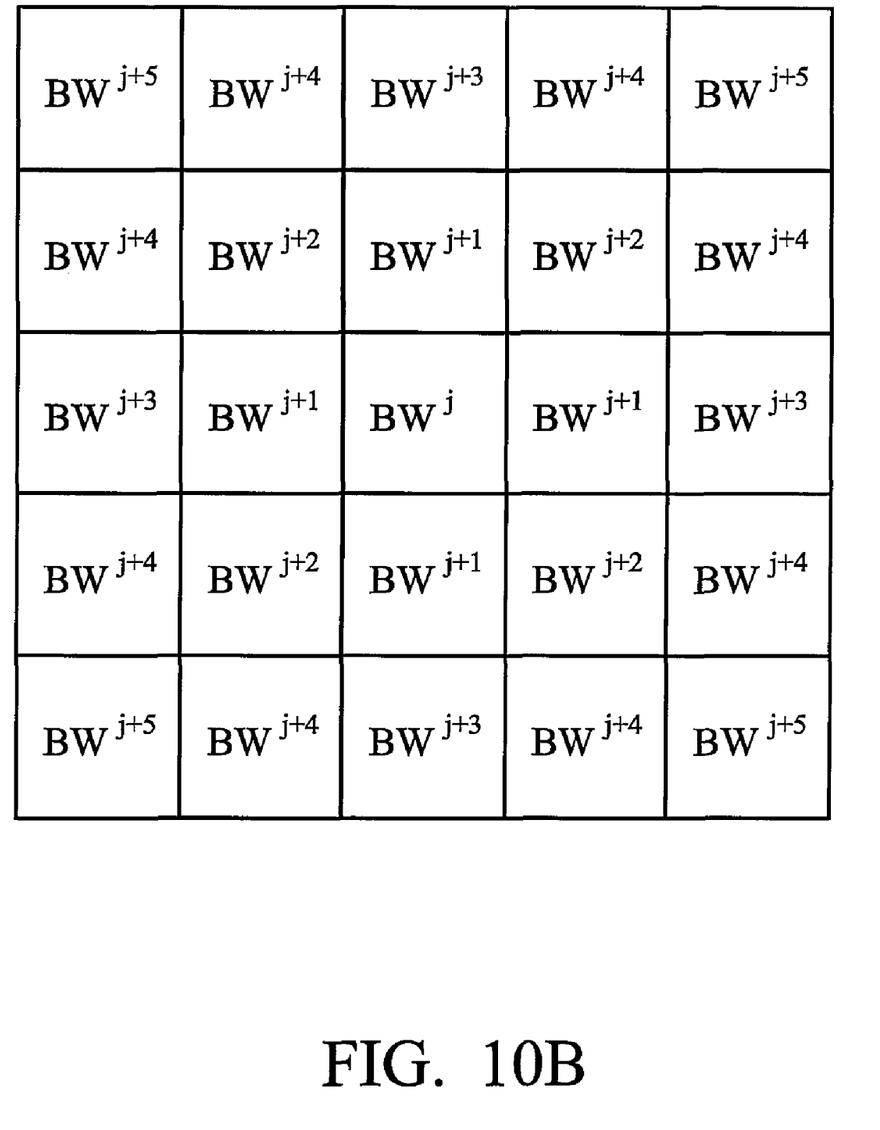
FIG. 10B is a schematic diagram illustrating an embodiment of a confidence weight mask according to the invention.

In some embodiments, after the user is identified, the service providing unit can be determined according to the current state and related information such as preferences of the user. FIG. 9 is a schematic diagram illustrating an embodiment of a relationship between service providing units and application conditions according to the invention. In this embodiment, several application conditions 921, 922 and 923 are in the environment. The application conditions may be the current user state such as position, and movement direction and speed, the service situations such as 'activated' or 'deactivated' of the service providing units in the environment, and/or the environment information. A specific service providing unit 910 can be determined, and whether to activate the service on the service providing unit 910 can be determined according to the application conditions. For example, an electric light can be determined whether to provide a lighting service according to the current user state, the current time, and the service situation of the television. It is understood that related information for the historical and current application conditions, and the relationship between the application conditions and the service providing units are stored in the storage unit. In some embodiments, the services of the service providing units can be determined whether to activate according to the user state and the positions of the service providing units in the environment. The user has a position prediction mask, as shown in FIG. 10A. Each element in the position prediction mask represents a possible user environment coordinate, and has a probability. Additionally, each service providing unit has a confidence weight mask, as shown in FIG. 10B. Each element in the confidence weight mask represents an environment coordinate near by the service providing unit, and has a confidence weight. It is understood that the confidence weight can be set according to different requirements. For example, when the service providing unit is a television, the confidence weight for the position in front of the television is greater than that for the position at the rear of the television. The service of a service providing unit can be determined whether to activate according to the current user position, the position of the service providing unit, and the overlap of the position prediction mask and the confidence weight mask. Generally, the center of the position prediction mask is user positioning predicted by the system. That is, position $P_1$ in FIG. 10A is user positioning predicted by the system, and the relation of probabilities for different positions in the position prediction mask is $P_1 > P_2 > P_3$. If the confidence weight mask of the service providing unit in FIG. 10B is a normal distribution curve from center, the relation of weights for different positions in the confidence weight mask is $BW^j > BW^{j+1} > BW^{j+2} > BW^{j+3} > BW^{j+4} > BW^{j+5}$. Since the probabilities in the position prediction mask and the weights in the confidence weight mask are determined, the position having the highest probability for activating service can be also determined for a service providing unit. In FIGS. 10A and 10B, for example, when the position corresponding to $P_1$ in FIG. 10A and the position corresponding to $BW^j$ in FIG. 10B overlaps, the probability is highest to activate the service providing unit, wherein the probability of respective element in FIG. 10A is multiplied by the weight of the respective element in FIG. 10B, and the sum of the products is the highest probability for activating the service providing unit. Therefore, the position prediction mask and the confidence weight mask are overlapped to calculate a sum of product of respective elements in FIGS. 10A and 10B. The sum is then divided by the highest probability for activating the service providing unit to obtain a probability for determining whether to activate the service providing unit.

In the application, the methods and systems for tracking users and providing services can use pressure sensors to detect the weights of users and objects in an environment, determine user state according to the sensed signals from the pressure sensors, and provide related services on the service providing units accordingly.

Methods and systems for tracking users and providing services, or certain aspects or portions thereof, may take the form of a program code (i.e., executable instructions) embodied in tangible media, such as products, floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A system for tracking objects and providing services, comprising:
    a plurality of pressure sensors set in an environment, detecting pressure applied thereon at a specific time point, and correspondingly generating sensed signals;
    a storage unit, storing historical sensed signals corresponding to the pressure sensors, and historical states of at least one object wherein the historical states of the at least one object comprises a position and a moving speed of the object;
    at least one service providing unit having a service; and
    a signal processing unit, receiving the sensed signals from the pressure sensors, and storing the sensed signals to the storage unit, calculating a state of the object according to the sensed signals and the historical sensed signals and the historical states of the object in the storage unit, and determining one of the at least one service providing unit to activate the service thereon, according to the state of the object.

2. The system of claim 1, further comprising a signal receiver to receive the sensed signals from the pressure sensors, performing an error adjustment and a de-noising operation on the sensed signals, and transmitting the processed sensed signals to the processing unit.

3. The system of claim 1, wherein the processing unit calculates the state of the object by de-noising the sensed signals, filtering the sensed signals according to a state of the object at a previous time point prior to the specific time point, calculating a possibility for the state of the object according to the sensed signals and a distribution character of the historical sensed signals, adjusting the possibility for the state of the object according to the historical state of the object, and obtaining the state of the object according to the sensed signals and the possibility for the state of the object.

4. The system of claim 3, wherein noises de-noised from the sensed signals comprise a measurement error of the pressure sensors, signal interference to the pressure sensors, or a fixed difference applied on the pressure sensors.

5. The system of claim 3, wherein the state comprises a position and a speed of the object, and the processing unit predicts the state of object at the specific time point according to the state of the object at the previous time point prior to the specific time point, and filters the sensed signals according to the predicted state.

6. The system of claim 3, wherein the distribution character comprises at least one distribution curve, and the processing unit sets a confidence weight corresponding to the state of the object according to the distribution curve of the sensed signals to obtain the possibility.

7. The system of claim 1, wherein the processing unit further receives sensed signals from the pressure sensors at a preset time point, and sets the sensed signals at the preset time point as net sensed signals of the environment.

8. The system of claim 1, wherein the processing unit further calculates a weight of the object according to the sensed signals, and identifies the object according to the weight.

9. The system of claim 8, wherein the processing unit determines one of the at least one service providing unit according to the identified object and the state of the object.

10. The system of claim 1, wherein the service providing unit has a confidence weight mask, defining at least one confidence weight corresponding to the state of the object, and the processing unit determines whether to activate the service on the service providing unit according to the state of the object and the confidence weight mask.

11. The system of claim 1, wherein the processing unit further determines whether to activate the service on the service providing unit according to the state of the object and at least one application condition in the environment.

12. A method for tracking objects and providing services, comprising:
setting plurality of pressure sensors set in an environment, wherein the pressure sensors detect pressure applied thereon at a specific time point, and correspondingly generate sensed signals;
storing historical sensed signal corresponding to the pressure sensors, and historical states of at least one object, wherein the historical states of the object comprises a position and a moving speed of the object;
calculating a state of an object according to the sensed signals and historical sensed signals and historical states of the object; and
determining at least one service providing unit to activate service thereon according to the state of the object.

13. The method of claim 12, further comprising receiving the sensed signals from the pressure sensors by a signal receiver, and performing an error adjustment and a de-noising operation on the sensed signals.

14. The method of claim 12, wherein the calculation of the state of the object comprises:
de-noising the sensed signals;
filtering the sensed signals according to a state of the object at a previous time point prior to the specific time point;
calculating a possibility for the state of the object according to the sensed signals and a distribution character of the historical sensed signals;
adjusting the possibility for the state of the object according to the historical state of the object; and
obtaining the state of the object according to the sensed signals and the possibility for the state of the object.

15. The method of claim 14, wherein noises de-noised from the sensed signals comprise a measurement error of the pressure sensors, signal interference to the pressure sensors, or a fixed difference applied on the pressure sensors.

16. The method of claim 14, wherein the state comprises a position and a speed of the object, and the state of object at the specific time point is predicted according to the state of the object at the previous time point prior to the specific time point, and filters the sensed signals according to the predicted state.

17. The method of claim 14, wherein the distribution character comprises at least one distribution curve, and the method further comprises setting a confidence weight corresponding to the state of the object according to the distribution curve of the sensed signals to obtain the possibility.

18. The method of claim 12, further comprising receiving sensed signals from the pressure sensors at a preset time point, and setting the sensed signals at the preset time point as net sensed signals of the environment.

19. The method of claim 12, further comprising calculating a weight of the object according to the sensed signals, and identifying the object according to the weight.

20. The method of claim 19, further comprising determining the service providing unit according to the identified object and the state of the object.

21. The method of claim 12, wherein the service providing unit has a confidence weight mask, defining at least one confidence weight corresponding to the state of the object, and the service on the service providing unit is determined whether to activate according to the state of the object and the confidence weight mask.

22. The method of claim 12, further comprising determining whether to activate the service on the service providing unit according to the state of the object and at least one application condition in the environment.

* * * * *